UNITED STATES PATENT OFFICE.

JULIUS MOSLER, OF RIXDORF, GERMANY.

PROCESS OF MAKING CARAMEL FROM DISTILLERY REFUSE.

SPECIFICATION forming part of Letters Patent No. 511,353, dated December 26, 1893.

Application filed August 13, 1892. Serial No. 442,998. (No specimens.) Patented in England September 17, 1892, No. 12,214.

*To all whom it may concern:*

Be it known that I, JULIUS MOSLER, residing at Rixdorf, Germany, have invented certain new and useful Improvements in Methods of Manufacturing Caramel from Distillery Refuse, (which has been patented in Great Britain, No. 12,214, dated September 17, 1892,) of which the following is a specification.

The disposal of brewery and distillery refuse is, as is well known, very difficult, as, when the refuse is allowed to run into ponds or rivers, the sanitary authorities raise objections, and when it is allowed to collect in pits, it has been found to produce hurtful results, as the surrounding soil becomes more or less saturated, and, as a consequence, any adjacent wells or springs are contaminated. To overcome the difficulty, it was at first proposed to evaporate the refuse, but this plan was not successfully carried out on account of the expense for fuel and machinery.

The present invention is designed to solve the difficulty by producing from the refuse a useful and marketable commodity in the form of a caramel product.

The method of preparation is as follows: One hectoliter of refuse, such as spoiled beer, sediment from casks, vats, &c., water which has been in use for rinsing purposes, and the like is conducted into a reservoir. From the reservoir, the refuse passes through a suitable opening into what is known as a "filter range," that is, a series of filters. The filters, which are, or may be arranged one on top of the other, are filled with cellulose, bone ashes, and burnt magnesia. After the liquor has passed through the filters, it is conducted to one or more vacuum pans, and there evaporated. The residuum remaining in the pans is taken out and roasted in roasting pans. This completes the first part of the process, the caramel product being extracted from the raw material. This material is now mixed with water and boiled for some time, two and one-half grams of soda and five grams of milk of lime being added during the boiling process. It is then filtered again, and subsequently boiled with an addition of two and one-half grams of glycerine. During the boiling process, the scum is continuously taken off the liquid. The boiling is continued until the liquor has acquired a clear color and consistency.

The advantage of the invention is obvious, as a waste product which was formerly considered both injurious and of no value, can now be utilized to produce a valuable and marketable commodity. The caramel product is used for coloring liquids such as beer.

What I claim is—

A process for producing caramel product from brewery and distillery refuse, consisting in first passing the refuse through filters, then evaporating the filtrate in vacuum pans; and roasting the residuum in roasting pans, thereafter mixing it with water and again boiling it, soda and milk of lime being added during the boiling process, subsequently filtering and lastly boiling it with glycerine, until the liquid possesses the required color and consistence, substantially as described.

In witness whereof I have hereunto set my hand in presence of two witnesses.

JULIUS MOSLER.

Witnesses:
R. BAYER,
W. HAUPT.